(12) United States Patent
Park et al.

(10) Patent No.: US 7,342,871 B2
(45) Date of Patent: Mar. 11, 2008

(54) HIGH DENSITY OPTICAL DISC AND METHOD FOR REPRODUCING AND RECORDING DATA THEREOF

(75) Inventors: Kyung Chan Park, Seoul (KR); Young Kuk Kim, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 10/448,344

(22) Filed: May 30, 2003

(65) Prior Publication Data

US 2003/0223333 A1 Dec. 4, 2003

(30) Foreign Application Priority Data

May 30, 2002 (KR) ............... 10-2002-0030424
May 22, 2003 (KR) ............... 10-2003-0032545

(51) Int. Cl.
*G11B 7/00* (2006.01)

(52) U.S. Cl. ............... 369/275.4; 369/52.1; 369/52.25

(58) Field of Classification Search ............ None
See application file for complete search history.

(56) References Cited

U.S. PATENT DOCUMENTS

| | | | |
|---|---|---|---|
| 5,546,364 A * | 8/1996 | Fuji et al. .......... | 369/13.54 |
| 5,737,287 A | 4/1998 | Lee | |
| 5,809,007 A | 9/1998 | Takemura et al. | |
| 5,933,410 A * | 8/1999 | Nakane et al. ....... | 369/275.3 |
| 6,249,553 B1 * | 6/2001 | Honma ............... | 375/341 |
| 6,519,213 B1 * | 2/2003 | Song et al. .......... | 369/44.26 |
| 6,587,417 B2 | 7/2003 | Okamoto et al. | |
| 6,711,111 B2 | 3/2004 | Okamoto et al. | |
| 6,751,174 B1 * | 6/2004 | Takahashi ............ | 369/47.37 |
| 6,870,804 B2 | 3/2005 | Okamoto et al. | |
| 6,894,962 B1 | 5/2005 | Nishiuchi et al. | |

(Continued)

FOREIGN PATENT DOCUMENTS

EP  0 768 647 B1  10/1996

(Continued)

OTHER PUBLICATIONS

Machine Translation, Fujimoto JP 08339543 A, Dec. 1996.*

*Primary Examiner*—William R. Korzuch
*Assistant Examiner*—Joseph Haley
(74) *Attorney, Agent, or Firm*—Harness, Dickey & Pierce, P.L.C.

(57) ABSTRACT

A high-density optical disc such as a high density-digital versatile disc (HD-DVD) or Blu-ray disc, and a method for reproducing or recording data of the high-density optical disc. The high-density optical disc includes a lead-in area, a data area and a lead-out area. The lead-in area has control information. A minimum mark or space length of the control information recorded in the lead-in area is longer than that of data recorded in the data area. The control information of the lead-in area is copied to the lead-out area. On the basis of the data reproduction or recording method, an optical disc device can correctly read and confirm the control information from the high-density optical disc, minimize the interference between a mark and space in high-density recording data, reduce the effects of scratches or dust on the disc, and efficiently prevent an erroneous data reproduction or recording operation.

12 Claims, 11 Drawing Sheets

U.S. PATENT DOCUMENTS

| | | | |
|---|---|---|---|
| 6,958,965 B2 * | 10/2005 | Ueda et al. | 369/53.21 |
| 7,012,873 B2 | 3/2006 | Okamoto et al. | |
| 7,215,620 B2 | 5/2007 | Nishiuchi et al. | |
| 7,239,591 B2 | 7/2007 | Okamoto et al. | |
| 2006/0114782 A1 | 6/2006 | Okamoto et al. | |
| 2007/0070871 A1 | 3/2007 | Okamoto et al. | |
| 2007/0070873 A1 | 3/2007 | Okamoto et al. | |
| 2007/0076565 A1 | 4/2007 | Okamoto et al. | |
| 2007/0076567 A1 | 4/2007 | Okamoto et al. | |
| 2007/0076569 A1 | 4/2007 | Okamota et al. | |
| 2007/0076572 A1 | 4/2007 | Okamoto et al. | |

FOREIGN PATENT DOCUMENTS

| | | |
|---|---|---|
| EP | 1 124 221 B1 | 10/1999 |
| JP | 07-111046 | 4/1995 |
| JP | 07-121875 | 5/1995 |
| JP | 07-130098 | 5/1995 |
| JP | 07-307043 | 11/1995 |
| JP | 08-124160 | 5/1996 |
| JP | 08-339543 | 12/1996 |
| JP | 08339543 A * | 12/1996 |
| JP | 09-017107 | 1/1997 |
| JP | 11-096691 | 4/1999 |
| JP | 2001-110054 | 4/2001 |
| JP | 2001-331944 | 11/2001 |

* cited by examiner

DVD (Digital Versatile Disc)

FIG. 7(a)

Data sturcture of BCA-code

| 1 byte | 4 bytes | | | | | |
|---|---|---|---|---|---|---|
| SB(3,3) | BCA pre-amble (all 00h) | | | | 1 row | |
| SB(0,0) | I(0,0) | I(1,0) | I(2,0) | I(3,0) | 4 rows data | 1st data unit |
| SB(0,0) | I(4,0) | I(5,0) | I(6,0) | I(7,0) | | |
| SB(0,0) | I(8,0) | I(9,0) | I(10,0) | I(11,0) | | |
| SB(0,0) | I(12,0) | I(13,0) | I(14,0) | I(15,0) | | |
| SB(0,1) | C(0,0) | C(1,0) | C(2,0) | C(3,0) | 4 rows parity | |
| SB(0,1) | C(4,0) | C(5,0) | C(6,0) | C(7,0) | | |
| SB(0,1) | C(8,0) | C(9,0) | C(10,0) | C(11,0) | | |
| SB(0,1) | C(12,0) | C(13,0) | C(14,0) | C(15,0) | | |
| SB(0,2) | I(0,1) | I(1,1) | I(2,1) | I(3,1) | 4 rows data | 2nd data unit |
| SB(0,2) | I(4,1) | I(5,1) | I(6,1) | I(7,1) | | |
| SB(0,2) | I(8,1) | I(9,1) | I(10,1) | I(11,1) | | |
| SB(0,2) | I(12,1) | I(13,1) | I(14,1) | I(15,1) | | |
| SB(0,3) | C(0,1) | C(1,1) | C(2,1) | C(3,1) | 4 rows parity | |
| SB(0,3) | C(4,1) | C(5,1) | C(6,1) | C(7,1) | | |
| SB(0,3) | C(8,1) | C(9,1) | C(10,1) | C(11,1) | | |
| SB(0,3) | C(12,1) | C(13,1) | C(14,1) | C(15,1) | | |
| SB(1,0) | I(0,2) | I(1,2) | I(2,2) | I(3,2) | 4 rows data | 3rd data unit |
| SB(1,0) | I(4,2) | I(5,2) | I(6,2) | I(7,2) | | |
| SB(1,0) | I(8,2) | I(9,2) | I(10,2) | I(11,2) | | |
| SB(1,0) | I(12,2) | I(13,2) | I(14,2) | I(15,2) | | |
| SB(1,1) | C(0,2) | C(1,2) | C(2,2) | C(3,2) | 4 rows parity | |
| SB(1,1) | C(4,2) | C(5,2) | C(6,2) | C(7,2) | | |
| SB(1,1) | C(8,2) | C(9,2) | C(10,2) | C(11,2) | | |
| SB(1,1) | C(12,2) | C(13,2) | C(14,2) | C(15,2) | | |
| SB(1,2) | I(0,3) | I(1,3) | I(2,3) | I(3,3) | 4 rows data | 4th data unit |
| SB(1,2) | I(4,3) | I(5,3) | I(6,3) | I(7,3) | | |
| SB(1,2) | I(8,3) | I(9,3) | I(10,3) | I(11,3) | | |
| SB(1,2) | I(12,3) | I(13,3) | I(14,3) | I(15,3) | | |
| SB(1,3) | C(0,3) | C(1,3) | C(2,3) | C(3,3) | 4 rows parity | |
| SB(1,3) | C(4,3) | C(5,3) | C(6,3) | C(7,3) | | |
| SB(1,3) | C(8,3) | C(9,3) | C(10,3) | C(11,3) | | |
| SB(1,3) | C(12,3) | C(13,3) | C(14,3) | C(15,3) | | |
| SB(3,2) | | | | | | |

HIGH DENSITY OPTICAL DISC AND METHOD FOR REPRODUCING AND RECORDING DATA THEREOF

BACKGROUND OF THE INVENTION

1. Field of the Invention

The present invention relates to a high-density optical disc such as a high density-digital versatile disc (HD-DVD) or Blu-ray disc, which includes a lead-in area, data area and lead-out area.

2. Description of the Related Art

FIG. 1 is a view illustrating the structure of a conventional digital versatile disc (DVD). The DVD 10 has a thickness of 1.2 mm and a diameter of 120 mm. The DVD 10 includes a center hole having a diameter of 15 mm, and a clamping area having a diameter of 44 mm so that a turntable and damper provided in an optical disc device can clamp the DVD 10.

A data recording layer based on a pit pattern is formed on the DVD 10. There is a distance of approximately 0.6 mm between the data recording layer and the surface of an optical transmission layer, which is arranged between the data recording layer and an objective lens (OL) of an optical pick-up provided in the optical disc device. The OL of the optical pick-up for the DVD has a numerical aperture (NA) value of 0.6.

As shown in FIG. 2, a high-density optical disc 20 such as a high density-digital versatile disc (HD-DVD) or Blu-ray disc has a thickness of 1.2 mm and a diameter of 120 mm. The high-density optical disc 20 includes a center hole having a diameter of 15 mm, and a clamping area having a diameter of 44 mm so that a turntable and clamper provided in an optical disc device can clamp the high-density optical disc 20. There is a distance of approximately 0.1 mm between a data recording layer and the surface of an optical transmission layer, which is arranged between the data recording layer and an objective lens (OL) of an optical pick-up provided in the optical disc device.

The OL of the optical pick-up for the high-density optical disc has a relatively larger NA value of 0.85, in comparison with the OL of the optical pick-up for the general DVD. In order for high-density recording data to be reproduced or recorded, the high-density optical disc uses a laser beam having a relatively shorter wavelength in comparison with the general DVD. That is, a laser beam having a wavelength of 650 nm is used for the general DVD 10, while a laser beam having a wavelength of 405 nm is used for the high-density optical disc so that the high-density recording data can be reproduced or recorded.

Thus, in a state where the OL of the optical pick-up for the high-density optical disc is closer to the recording layer of the high-density optical disc, the optical disc device employs a laser beam having a relatively shorter wavelength, and enables an NA value for the OL to be increased, thereby forming a small beam spot of the laser beam, having an increased light intensity, on the high-density recording layer. Further, an optical transmission layer transmitting a laser beam having a short wavelength can be reduced. Hence, variations of the laser beam's properties and aberration occurrence can be minimized.

As shown in FIG. 3, the high-density disc includes a lead-in area 201, data area 202 and lead-out area 203. In the lead-in area, are recorded control information needed for recording or reproducing data of the high-density optical disc, e.g., information associated with a size of the disc, a disc structure, a data recording density, a data area allocation, etc.

Therefore, when the high-density optical disc 20 is inserted and loaded within the optical disc device, the control information recorded in the lead-in area 201 is first read and confirmed. The optical disc device refers to the control information and then performs a sequence of reproduction or recording operations for reproducing data recorded in the data area 202 or recording data in the data area 202.

In the lead-in area 201, data area 202 and lead-out area 203, a channel bit length and data bit length are 80.00 nm and 120 nm in the case of a 23.3 GB high-density optical disc, respectively. In the case of a 25 GB high-density optical disc, the channel bit length and data bit length are 74.5 nm and 111.75 nm, respectively. In the case of a 27 GB high-density optical disc, the channel bit length and data bit length are 69.00 nm and 103.50 nm, respectively. Minimum mark/space lengths of data recorded in the areas 201, 202 and 203 are the same as each other.

As described above, the optical disc device must first and correctly read and confirm the control information recorded in the lead-in area so that the data of the high-density optical disc is reproduced or recorded. At this time, the interference between a mark and space may occur in high-density recording data. Further, scratches or dust on the surface of the optical disc can adversely affect the recording and reproduction of high-density recording data. For this reason, there are problems in that the control information cannot be appropriately read and hence a data reproduction or recording operation cannot be appropriately performed.

SUMMARY OF THE INVENTION

Therefore, the present invention has been made in view of the above problems, and it is an object of the present invention to provide a high-density optical disc, and a method for reproducing or recording data thereof, which can allow an optical disc device to correctly read and confirm control information recorded in a lead-in area included in the high-density optical disc such as a high density-digital versatile disc (HD-DVD) or Blu-ray disc.

In accordance with one aspect of the present invention, the above and other objects can be accomplished by the provision of a high-density optical disc, comprising: a lead-in area; a data area; and a lead-out area, wherein a minimum mark or space length of data recorded in the lead-in area is longer than that of data recorded in the data area.

Preferably, in accordance with the high-density optical disc of the present invention, the minimum mark or space length of the data recorded in the lead-in area may be longer than that of the data recorded in the data area, and the minimum mark or space length of the data recorded in the lead-in area may be the same as or longer than a valid diameter of a laser beam spot.

Preferably, in accordance with the high-density optical disc of the present invention, the lead-out area may comprise at least one data item being the same as the data recorded in the lead-in area, and the minimum mark or space length in the lead-in area is at least two times that of the data area.

Preferably, where a minimum mark or space length of data recorded in the lead-in area is longer than that of data recorded in the data area in accordance with the high-density optical disc of the present invention, the high-density optical disc may further comprise a specified area storing information associated with the minimum mark or space of the data recorded in the lead-in area and data area.

In accordance with another aspect of the present invention, there is provided a recording medium, comprising, a lead-in area and/or lead-out area; and a user data area, wherein a length of mark or space formed in the lead-in area is longer than that of mark or space recorded or to be recorded in the user data area, and the mark or space recorded or to be recorded in the user data area is formed such that the data comprising mark or space is reproduced using a Viterbi decoder.

In accordance with another aspect of the present invention, there is provided a method for reproducing or recording data of a high-density optical disc, comprising the steps of: (a) detecting a rotation velocity of a spindle motor in a procedure of reading data recorded in a lead-in and/or lead-out area and comparing the detected rotation velocity with a predetermined reference rotation velocity; and (b) applying one of first or second reproduction processing method to reproduce the data recorded in the lead-in and/or lead-out area based on the result of the step (a).

In accordance with another aspect of the present invention, there is provided a method for reproducing or recording data of a high-density optical disc, comprising the steps of: (a) reading information items associated with the minimum mark or space lengths of the data recorded in a lead-in and/or lead-out area and user data area from the specified area; and (b) determining a reproduction processing method to reproduce the data recorded in the lead-in and/or lead-out area or user data area based on the result of step (a).

In accordance with another aspect of the present invention, there is provided a method for recording information on an optical recording medium, comprising the steps of: (a) recording, in the user data area, data to be recorded according to a control signal from controller; and (b) recording, in a specific area other than the user data area, first control information to control reproduction of the recorded data in the user data area, wherein the control information is to indicate a minimum length of mark or space recorded in the user data area.

In accordance with another aspect of the present invention, there is provided a method for recording information on an optical recording medium which includes lead-in area, user data area, and lead-out area, comprising the steps of: (a) recording, in the user data area, data to be recorded according to a control signal from controller; and (b) recording, in a specified area other than the user data area, control information to control reproduction of the recorded data in the user data area, wherein the control information includes information for indicating a minimum length of mark or space recorded in user data area and a minimum length of mark or space in the lead-in or lead-out area respectively.

In accordance with another aspect of the present invention, there is provide a method for recording data on a recording medium, comprising the steps of: (a) processing data to be recorder in the user data area to form a mark or space on the optical recording medium, a length of mark or space in user data area being shorter than that of mark or space in lead-in area and/or lead-out area; and (b) recording the processed data in the user data area.

In accordance with another aspect of the present invention, there is provided a method for reading data from a recording medium, comprising: (a) receiving a command to read data recorded in lead-in area or user data area, wherein data recorded in the lead-in area has a length of mark or space different from that of data recorded in the user data area; and (b) selecting a processing block to read one of data recorded in lead-in area and user data area based on the command.

In accordance with another aspect of the present invention, there is provided a method for reading data from a recording medium, comprising the steps of: (a) determining whether a mark or space recorded in a control data area and user data area are different from each other based on control information recorded in a specific area; and (b) determining a data processing method based on the step (a).

In accordance with another aspect of the present invention, there is provided a method for reading data from a recording medium, comprising the steps of: (a) identifying an area where data to be read is included, a length of mark or space recorded in a user data area being different from that of mark or space recorded in a lead-in and/or lead-out area; and (b) processing data recorded in the user data area using a Viterbi decoder if the area is identified as the user data area based on a result of step (a).

In accordance with another aspect of the present invention, there is provided an apparatus for reading data from a recording medium, comprising: (a) signal processor including at least two processing block to process data recorded in lead-in area or user data area, at least one of two processing block including a block for a partial response and maximum likelihood (PRML); and (b) controller controlling the signal processor to select one of two processing block of the signal processor to process respectively data recorded in lead-in area and user data area.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of a high-density optical disc and a method for reproducing or recording data thereof in accordance with the present invention will be described in detail with reference to the annexed drawings.

Figure 4:
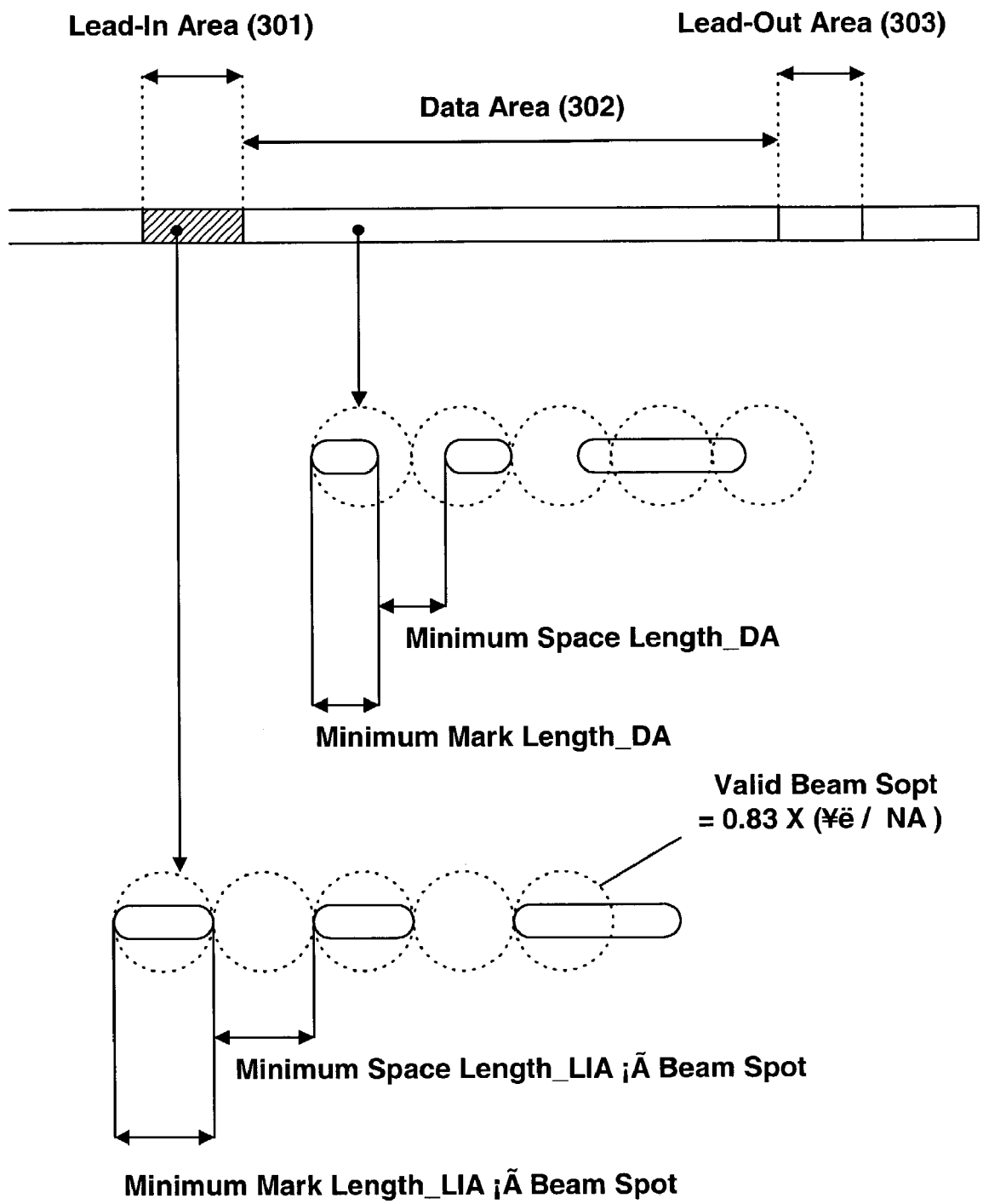
FIG. 4 is a view illustrating a state where data having different minimum mark/space lengths are recorded in a lead-in area and data area provided in a high-density optical disc in accordance with the present invention.

FIG. 4 is a view illustrating a state where data having different minimum mark/space lengths are recorded in a lead-in area and data area provided in a high-density optical disc in accordance with the present invention. For example, a high-density optical disc 30 such as a high density-digital versatile disc (HD-DVD) or Blu-ray disc includes a lead-in area 301, data area 302 and lead-out area 303. In the lead-in area 301 are recorded control information needed for recording or reproducing data of the high-density optical disc, e.g., information associated with a size of the disc, a disc structure, a data recording density, a data area allocation, etc. A minimum mark/space length of the control information recorded in the lead-in area 301 is longer than that of general video and audio data recorded in the data area 302.

For example, as shown in FIG. 4, the minimum mark length (Minimum Mark_LIA) of the control information recorded in the lead-in area 301 is longer than the minimum mark length (Minimum Mark_DA) of the general video and audio data recorded in the data area 302. The length of a minimum mark recorded in the lead-in area 301 is the same as or longer than a valid diameter of a beam spot depending upon the NA associated with an objective lens for the high-density optical disc and the wavelength λ of a laser beam.

As given by the following Equation 1, the valid diameter of the laser beam spot becomes approximately 395 nm where NA=0.85 and λ=405 nm (0.405 μm)

$$BeamSpot = 0.83 \times \frac{\lambda}{NA} = 0.83 \times \frac{0.405}{0.85} = 0.395 \ \mu m = 395 \ nm \quad \text{Equation 1}$$

In the above-described Equation 1, 0.83 is a coefficient, λ is the wavelength of a laser beam, and NA is a numerical aperture value.

Accordingly, the minimum mark length of the control information recorded in the lead-in area 301 is the same as or longer than the valid diameter 395 nm of the laser beam spot. Further, the minimum mark length of the control information recorded in the lead-in area 301 is longer than the minimum mark length of the video and audio data recorded in the data area 302. In this case, the minimum space length (Minimum Space_LIA) of the control information recorded in the lead-in area 301 is the same as or longer than the valid diameter 395 nm of the laser beam spot. The minimum space length of the control information recorded in the lead-in area 301 is longer than the minimum mark length (Minimum Space_DA) of the video and audio data recorded in the data area 302.

Figure 1:
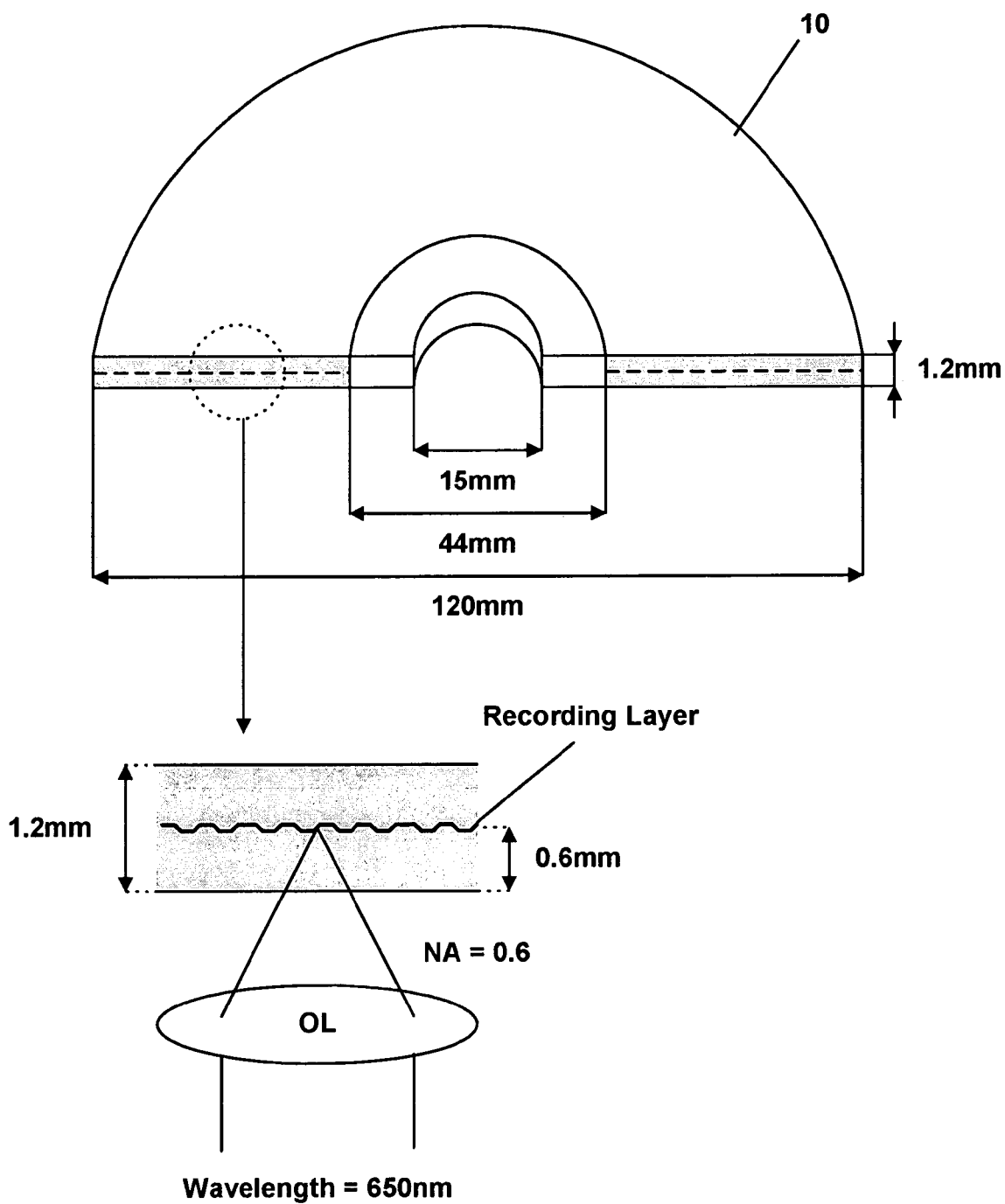
FIG. 1 is a view illustrating the structure of a conventional digital versatile disc (DVD)
Figure 2:
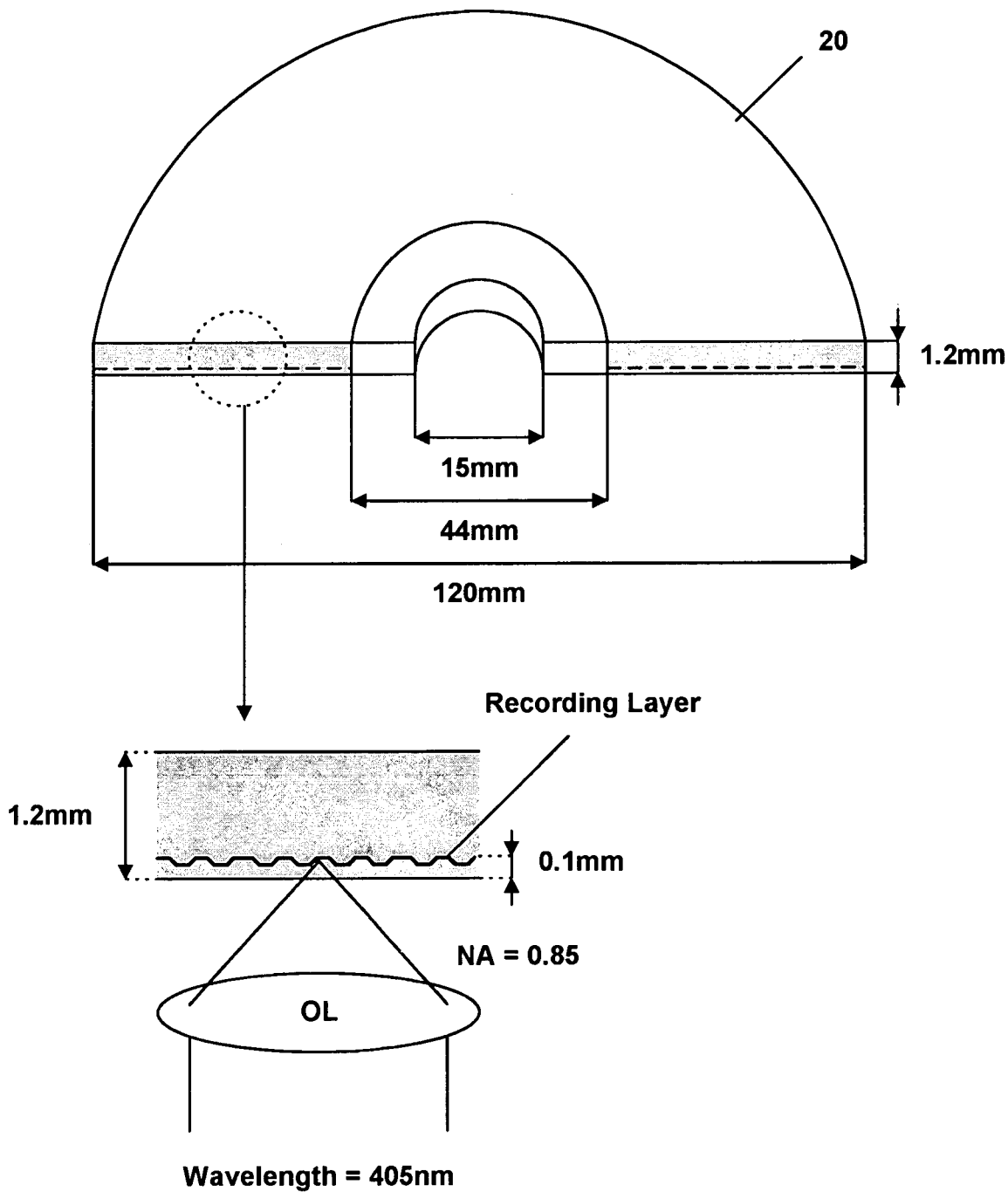
FIG. 2 is a view illustrating the structure of a conventional high-density optical disc such as a high density-digital versatile disc (HD-DVD) or Blu-ray disc.
Figure 3:
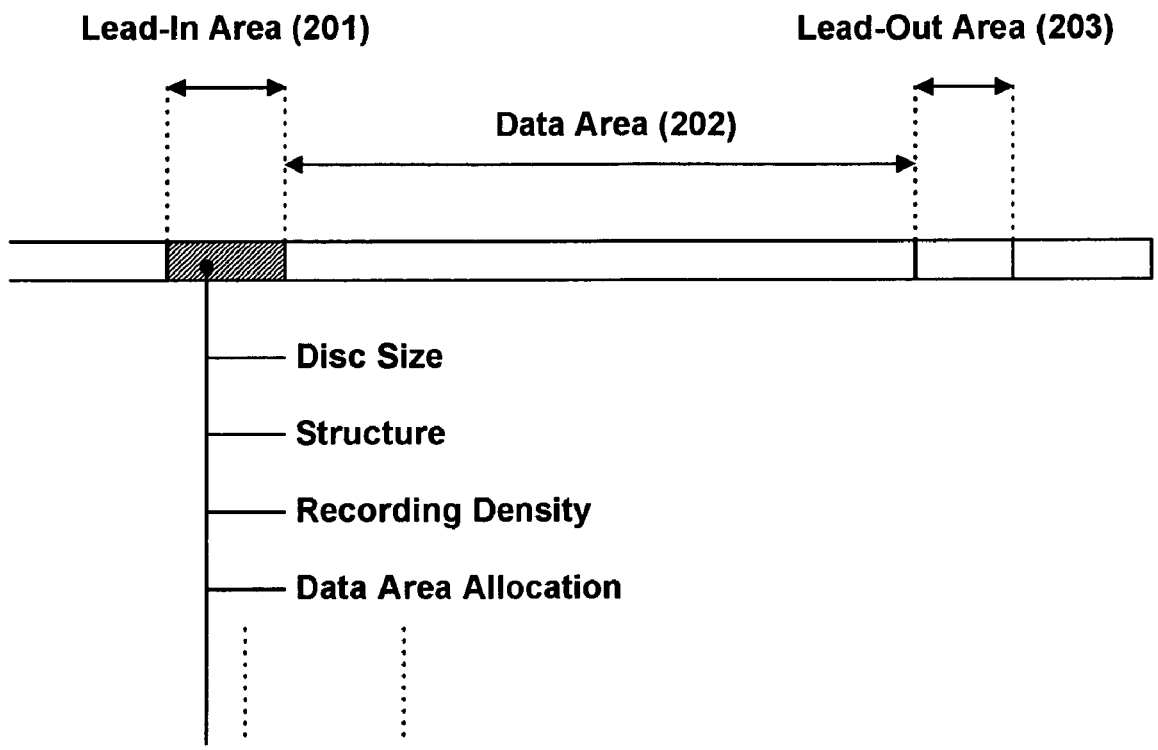
FIG. 3 is a view illustrating a lead-in area, data area and lead-out area provided in the conventional high-density optical disc.

Referring to the table shown in FIG. 3, for example, the high-density optical disc can have three types of recording densities. The three types of recording densities based on a single layer include 23.305 Gbytes, 25.025 Gbytes and 27.020 Gbytes. A channel bit length corresponding to each recording density, i.e., a length of "1T" is 80.00 nm in the case of 23.305 Gbytes. Further, the length of "1T" is 74.50 nm in the case of 25.025 Gbytes. Furthermore, the length of "1T" is 69.00 nm in the case of 27.020 Gbytes.

For example, where the recording density is 23.305 Gbytes, the valid diameter 395 nm of the beam spot produced by the above-described Equation 1 corresponds to a length of approximately 5T (395/80.00=4.9375 nm). A mark or space of data to be recorded in the data area has a length of "2T" to "8T". Thus, if the minimum mark or space length of data to be recorded in the lead-in area is the same as or longer than the valid diameter of the beam spot, a mark or space having a length of "5T" or more can be recorded as data of the lead-in area. In this case, a method for modulating data to be recorded in the lead-in area can be changed in order that a mark or space having a length of "5T" to "8T" or a length of "5T" to "11T" can be recorded. Further, in a state where the method for modulating data to be recorded in the lead-in area is the same as a method for modulating data to be recorded in the data area, the lengths of other marks or spaces can be increased in proportion to the increased minimum mark or space length.

First, since the lengths of other marks or spaces can be increased in proportion to the increased minimum mark or space length where the method for modulating data to be recorded in the lead-in area is the same as the method for modulating data to be recorded in the data area, a length of "2T" in the data area corresponds to a length of "5T" in the lead-in area, a length of "3T" in the data area corresponds to a length of "7.5T" in the lead-in area, and a length of "8T" in the data area corresponds to a length of "20T" in the lead-in area. Where the lengths of "5T" to "20T" are applied in place of the lengths of "2T" to "8T" as described above, there is a drawback in that the space of an embossed area may occupy much of the lead-in area. However, this drawback does not need to be seriously considered since the embossed area conventionally has sufficient space for recording the disc-related control information. There is a merit in that a load of an optical disc system can be reduced where the same data modulation methods for the lead-in area and data area are used.

On the other hand, where the data modulation method for the lead-in area containing data of a mark or space having the minimum mark or space length of "5T" or longer is different from the data modulation method for the data area, for example, where the data in the lead-in area is modulated using marks or spaces based on only four types of "5T", "6T", "7T" and "8T" or using marks or spaces based on lengths of "5T" to "11T", there is a merit in that less of the space of the lead-in area is occupied. However, there is a drawback in that a new modulation method must be designed and a new reproduction device for performing a demodulation method corresponding to the new modulation method is additionally needed in the optical disc system.

As described above, where the minimum mark or space length of data recorded in the lead-in area is longer than that of data recorded in the data area or where disc data based on the different data modulation methods associated with the lead-in area and data area is reproduced or recorded, information associated with the lead-in area of the disc needs to be recognized so that the lead-in area containing information needed for reproducing or recording the disc data can be appropriately read. That is, when a minimum mark or space length of data or a data modulation type of the lead-in area is recognized, the data recorded in the lead-in area can be appropriately read.

Figure 6:
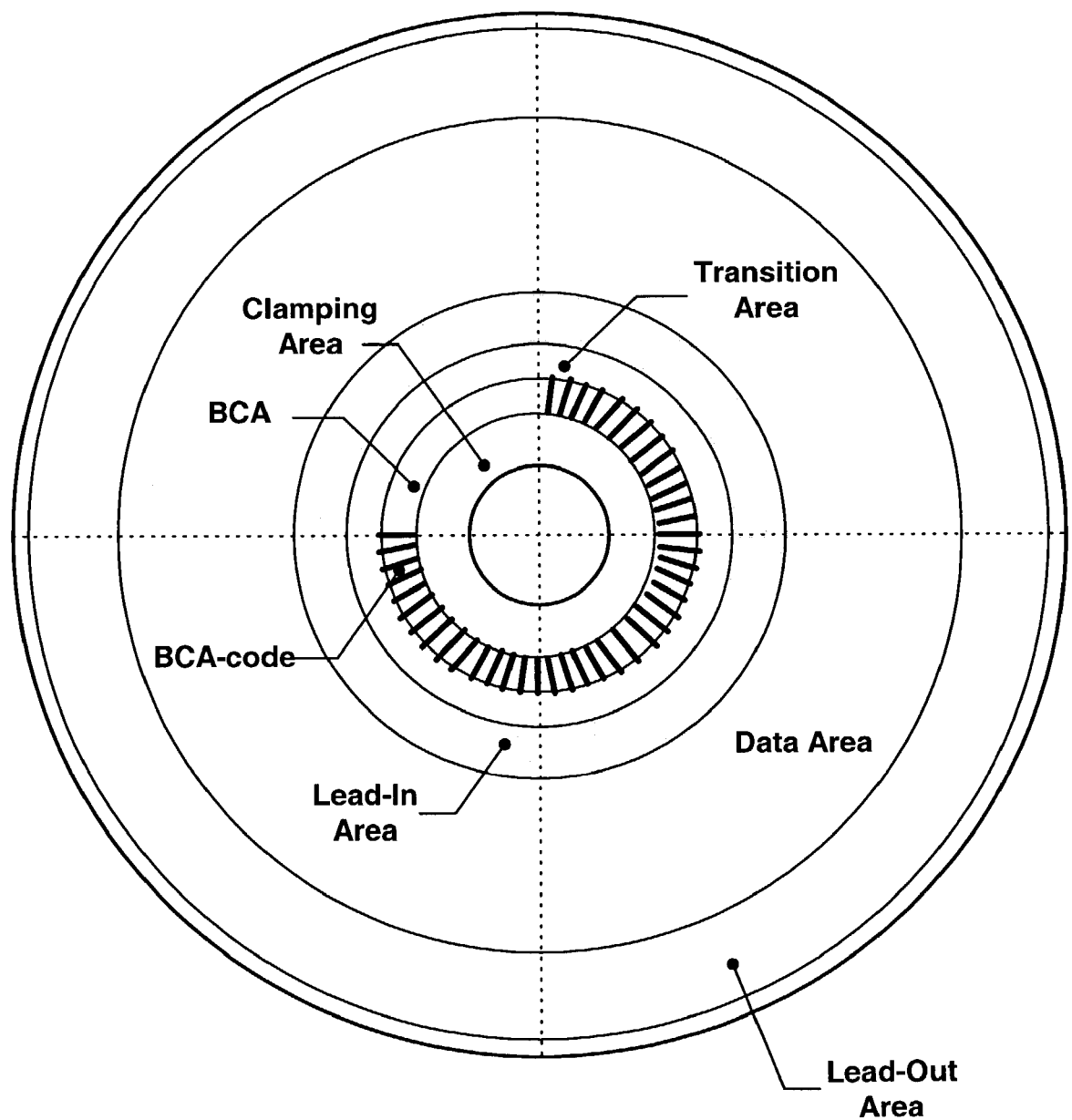
FIG. 6 is a view illustrating a burst cutting area (BCA) of the conventional high-density optical disc.

The information associated with the lead-in area needs to be recorded in a specified area, formed inner than the lead-in area, to be first read when the disc is inserted in the optical disc device. As shown in FIG. 6, there is formed a burst cutting area (BCA) inner than the lead-in area. So it is preferable that the information associated with the lead-in area is recorded in the BCA to be first read. The data recorded in the lead-in area can be appropriately reproduced using the information, associated with the lead-in area, recorded in the specified area as described above.

Figure 7B:
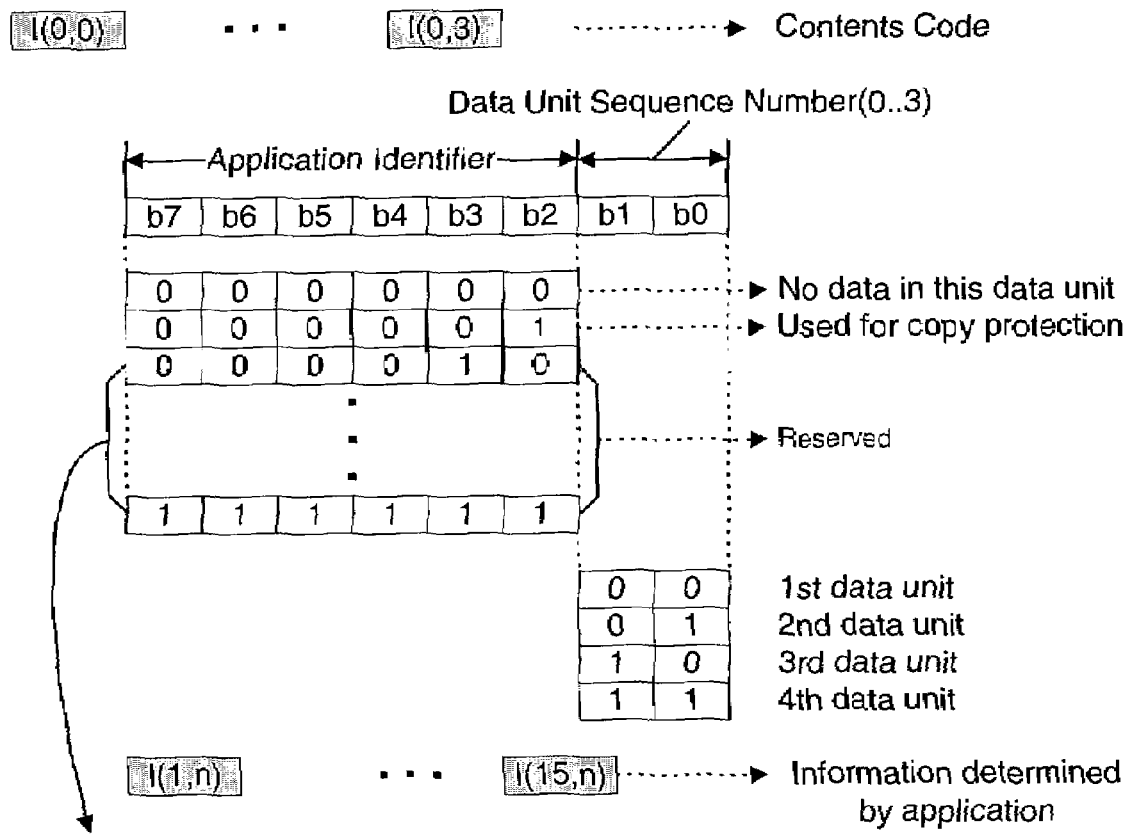
FIGS. 7(*a*) and 7(*b*) are views illustrating a data structure and data contents of BCA code for the conventional high-density optical disc.

Further, FIGS. 7A and 7B show a data structure and data contents associated with BCA code. For example, information indicating the minimum mark or space length of the lead-in area can be recorded in the $2^{nd}$ data unit. Information indicating the minimum mark or space length of the data area can be recorded in the $3^{rd}$ data unit. Information indicating a data modulation type for the lead-in area can be recorded in the $4^{th}$ data unit. In this case, "b1b0" and "b7b6b5b4b3b2" of the $1^{st}$ byte $I_{0,1}$ contained in the $2^{nd}$ data unit can be "01" and "000010", respectively. The remaining 15 bytes contained in the $2^{nd}$ data unit can be used for indicating the minimum mark or space length of the lead-in area. Similarly, "b1b0" and "b7b6b5b4b3b2" of the $1^{st}$ byte $I_{0,2}$ contained in the 3rd data unit can be "10" and "000010", respectively. The remaining 15 bytes contained in the $3^{rd}$ data unit can be used for indicating the minimum mark or space length of the data area. Similarly, "b1b0" and "b7b6b5b4b3b2" of the $1^{st}$ byte $I_{0,3}$ contained in the $4^{th}$ data unit can be "11" and "000010", respectively. The remaining 15 bytes contained in the $4^{th}$ data unit can be used for indicating the data modulation type.

Figure 8:
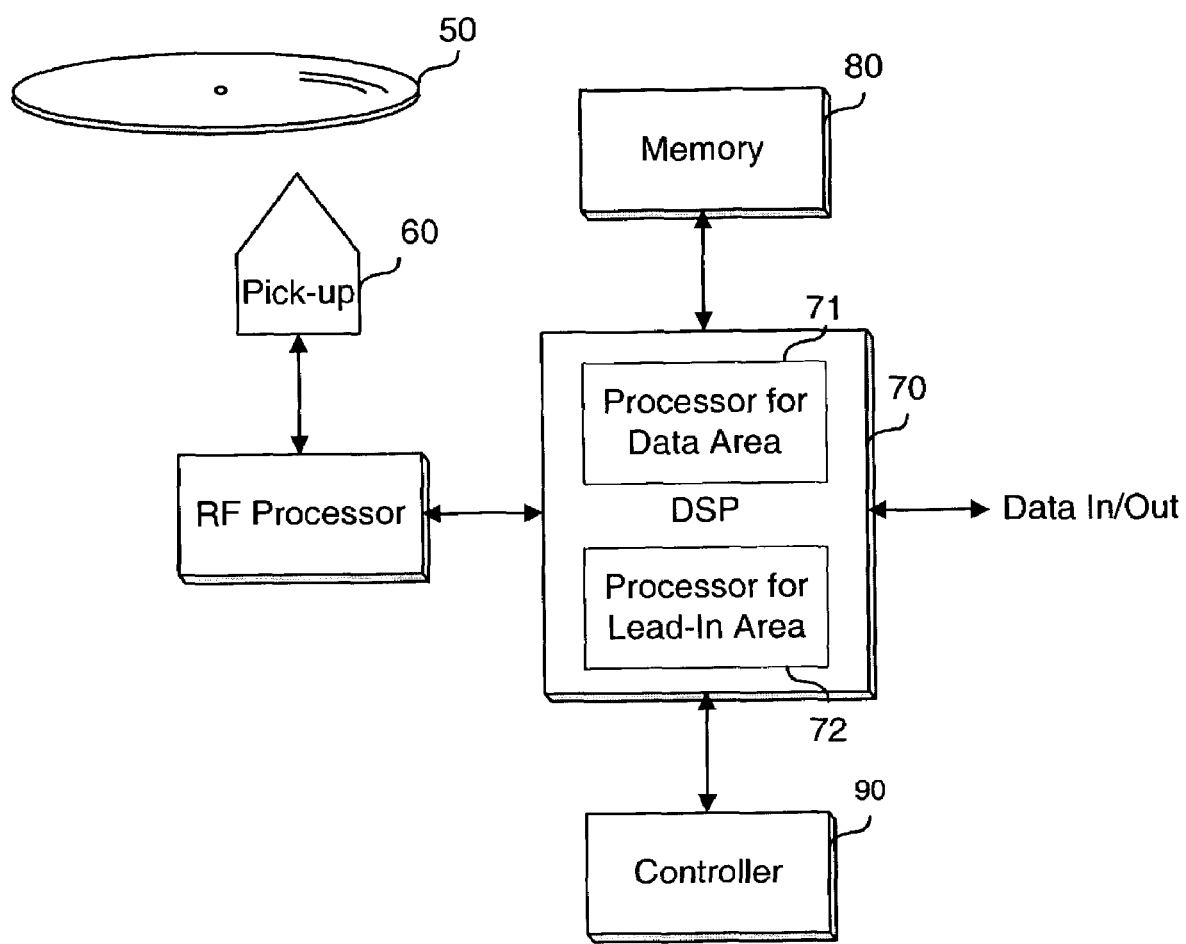
FIG. 8 is a view illustrating a system for recording and reproducing data of the high-density optical disc in accordance with the present invention.

FIG. 8 is a view illustrating a system for recording and reproducing data of the high-density optical disc in accordance with the present invention.

The system includes a high-density optical disc 50; an optical pick-up 60 for picking up data from the optical disc 50 or recording on the optical disc 50; a radio frequency (RF) processor for shaping a waveform of data read by the optical pick-up 60; a digital signal processor (DSP) 70 for converting data reproduced by the RF processor in a digital manner to demodulate the data at a time of reproducing the data or modulating data at a time of recording the data; a buffer memory 80 for temporarily storing the data; and a controller 90 for controlling the above-described components of the system. The DSP 70 can include a processor 71 for the data area based on a default demodulation and reproduction signal processing method appropriate for reproducing general data recorded in the data area of the high-density optical disc; and a processor 72 for the lead-in area based on another demodulation and reproduction signal processing method appropriate for reproducing data in a state where the minimum mark or space length of the lead-in area has been lengthened or the data of the lead-in area has been especially modulated.

When the optical disc 50 is loaded in the system and data of the optical disc 50 read by the optical pick-up 60 is inputted into the DSP 70 through the RF processor, the controller 90 preferably performs a control operation such that the demodulation and reproduction signal processing method appropriate for reproducing the data recorded in the lead-in area can be selected using information, associated with the lead-in area, recorded in the innermost area of the optical disc 50.

As the minimum mark/space length of the data recorded in the lead-in area is the same as or longer than the valid diameter of the laser beam spot, the optical disc device for reproducing or recording data of the high-density optical disc can more correctly read and confirm control information recorded in the lead-in area. Thus, the interference between a mark and space in the high-density recording data can be minimized, and the effects of scratches or dust can be reduced. For this reason, an erroneous data reproduction or recording operation can be effectively prevented.

Figure 5:
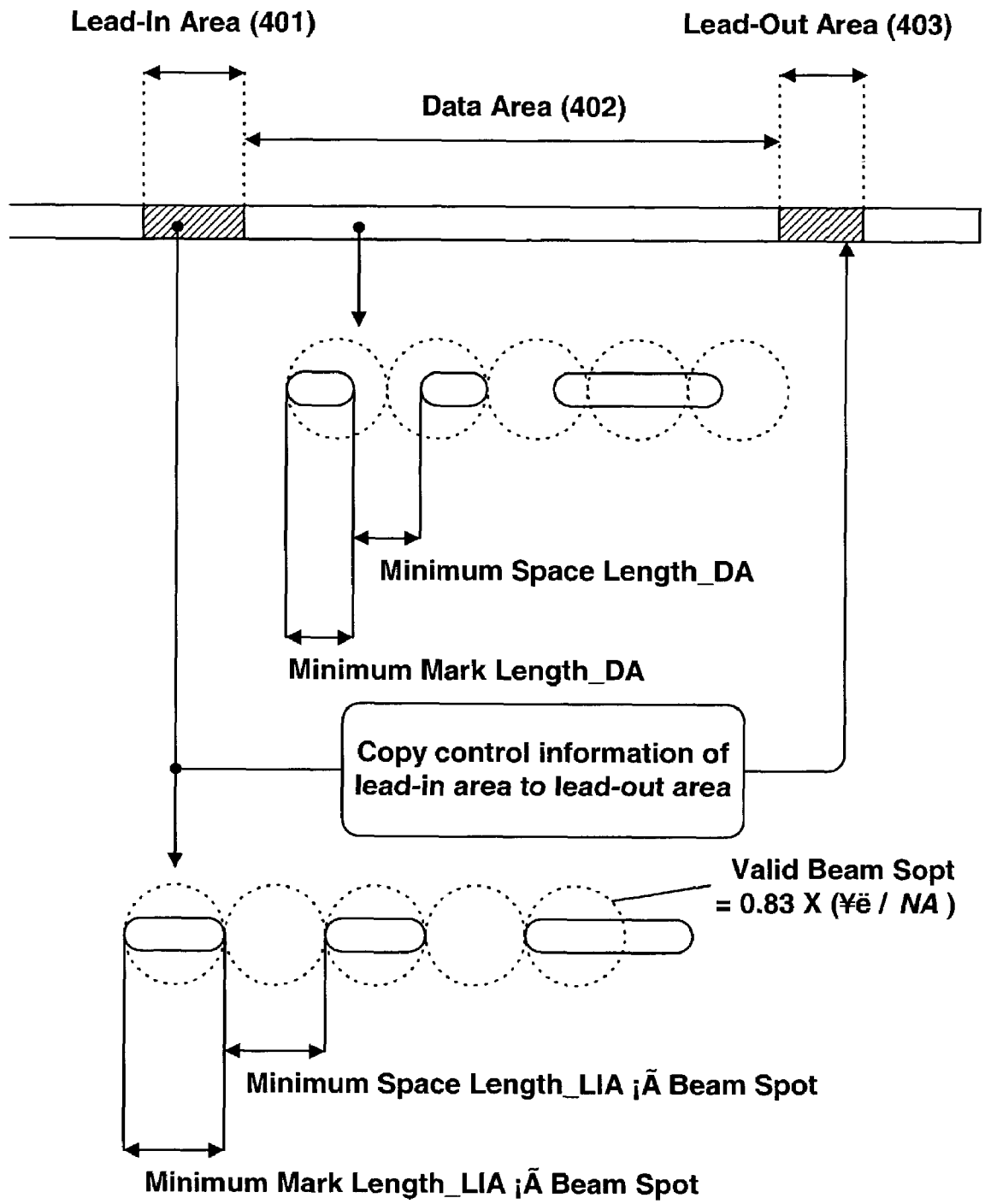
FIG. 5 is a view illustrating a state where control information recorded in the lead-in area included in the high-density optical disc is copied to the lead-out area in accordance with the present invention.

In preparing for the case where the scratch or dust having a certain size or larger exists on the lead-in area of the above-described high-density optical disc, the control information of the lead-in area can be copied to the lead-out area 403 as shown in FIG. 5.

Next, there will be described the method for reproducing or recording data of the high-density optical disc in a state where the minimum mark or space length of data of the lead-in area is longer than that of data of the data area.

When the disc is loaded, the general disc reproduction or recording device performs an operation of reading control information recorded in the lead-in area of the disc and storing the read information in a memory. As the disc reproduction or recording device rotates a spindle motor to maintain a constant user data bit rate, a constant linear velocity is maintained in the lead-in area, the data area, an inner area or an outer area.

Thus, where the mark or space length of data recorded in the lead-in area is the same as that of data recorded in the data area, a linear velocity associated with a disc rotation for reading the data of the lead-in area equals that associated with the disc rotation for reading the data of the data area. Thus, the rotation velocity of the spindle motor can be predicted when the lead-in area located within a predetermined radius of the optical disc is read.

However, if the mark or space length of the data recorded in the lead-in area is longer than that of the data recorded in the data area, as a linear velocity for maintaining the constant user data bit rate associated with the lead-in area is faster than that for maintaining the constant user data bit rate associated with the data area, the rotation velocity of the spindle motor for reading the data of the lead-in area becomes faster than the predicted rotation velocity.

Meanwhile, if a data density is high, i.e., the mark or space length is short or a distance between tracks is narrow, the beam spot resolution is degraded and the characteristic of an optical transfer function is degraded, such that it is difficult for a signal read by the optical pick-up to be appropriately demodulated and reproduced. For this reason, a modulation method is changed or a demodulation method such as a partial response maximum likelihood (PRML) or Viterbi-related demodulation method used in a communication system is used in order that the read signal can be appropriately demodulated and reproduced.

The demodulation method for reproducing the read signal is applied for only processing data modulated by the corresponding modulation method. The above-described demodulation method cannot be applied where the data is modulated by a different modulation method or the characteristic of the optical transfer function is changed. Thus, where the mark or space length of the lead-in area is different from that of the data area, the characteristics of optical transfer functions associated with the lead-in area and data area are different. For this reason, different signal processing methods must be applied for the different areas when the read signal is demodulated and reproduced.

Figure 9:
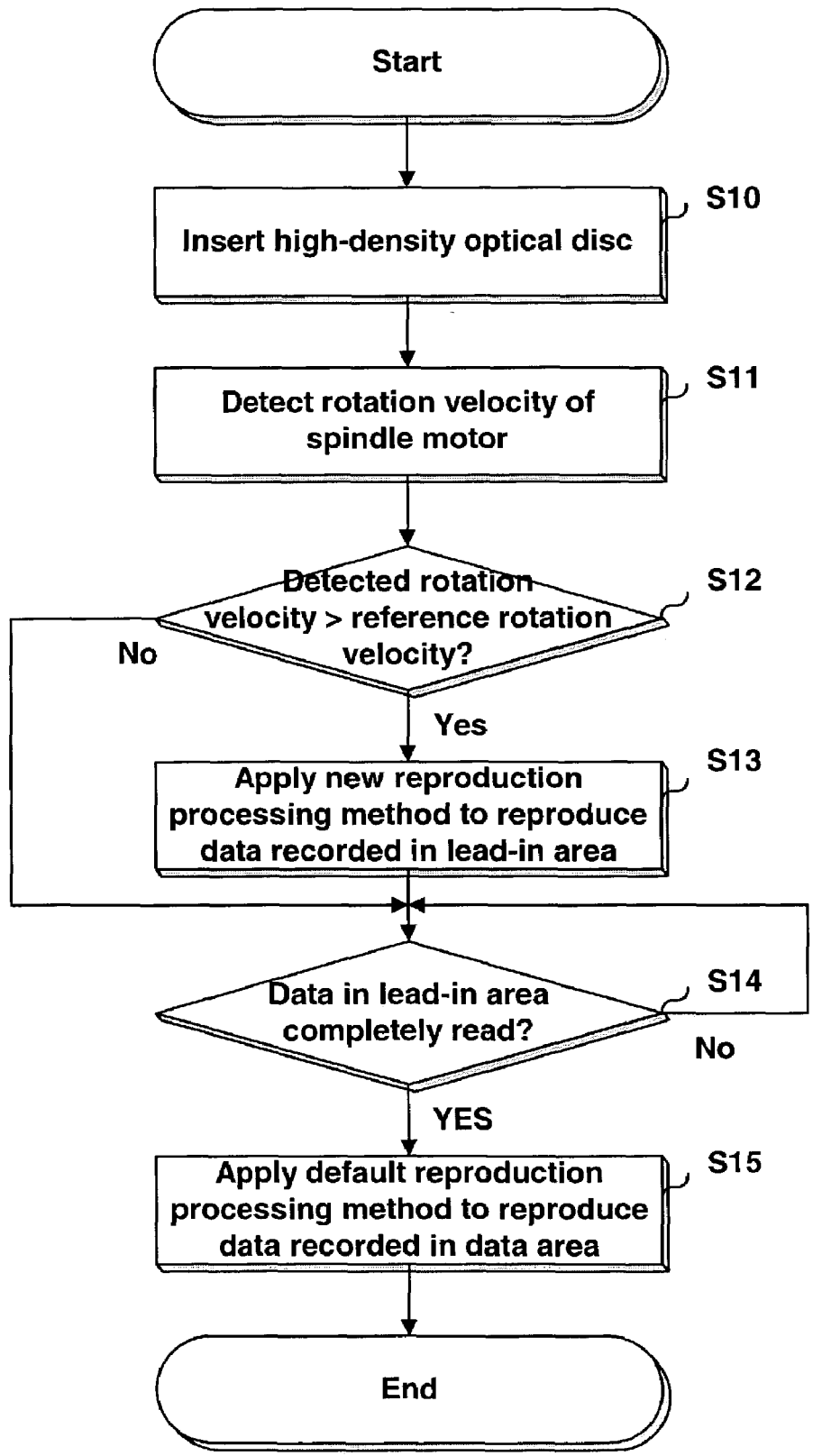
FIG. 9 is a flowchart illustrating a method for recording and reproducing the data of the high-density optical disc in accordance with the first embodiment of the present invention.

FIG. 9 is a flowchart illustrating a method for recording and reproducing the data of the high-density optical disc in accordance with the first embodiment of the present invention.

When the high-density optical disc is inserted and loaded in an optical disc reproduction or recording device at step S10, the device detects the rotation velocity of a spindle motor while rotating the disc on the basis of a linear velocity for reading data recorded in the lead-in area at a user data bit rate at step S11.

The device compares the detected rotation velocity with a predetermined reference rotation velocity at step S12. Herein, the predetermined reference rotation velocity is the velocity needed in order for data in lead-in area, the minimum mark or space length of which is same as that of data in data area, to be read at the user data bit rate. At this time, if the detected rotation velocity is higher than the reference rotation velocity, it is determined that the minimum mark or space length of data recorded in the lead-in area is longer than that of data recorded in the data area. The device reads the lead-in area using a new reproduction processing method to reproduce data of the lead-in area having the minimum mark or space being relatively longer at step S13. Then, the device determines whether data recorded in the lead-in area has been completely read at step S14. If the data recorded in the lead-in area has been completely read, the reproduction processing method is switched to a default reproduction processing method for reproducing data recorded in the data area and then performs a reproduction or recording operation at step S15.

Figure 10:
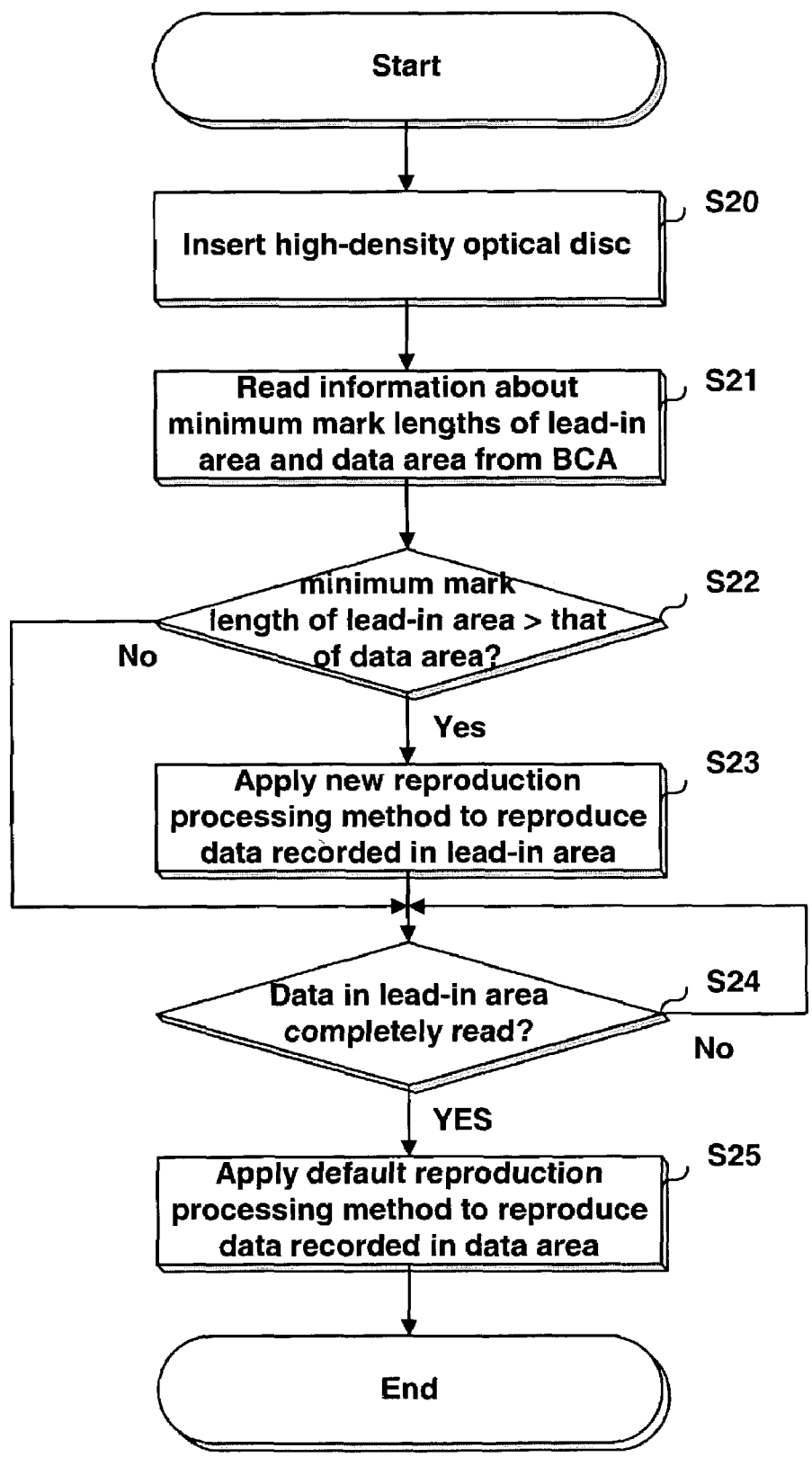
FIG. 10 is a flowchart illustrating a method for recording and reproducing the data of the high-density optical disc in accordance with the second embodiment of the present invention.

FIG. 10 is a flowchart illustrating a method for recording and reproducing the data of the high-density optical disc in accordance with the second embodiment of the present invention.

When the high-density optical disc having a specified area in which information items associated with the minimum marks or spaces of a lead-in area and data area are recorded, is inserted and loaded in an optical disc reproduction or recording device at step S20, the device reads the information items associated with the minimum mark or space lengths of the areas from the specified area of the optical disc at step S21. The device compares values of the information items at step S22. If the minimum mark or space length of the lead-in area is longer than that of the data area as a result of the comparison, the device reads the lead-in area using a new reproduction processing method for reproducing the data of the lead-in area having the minimum mark or space being relatively longer at step S23. The device determines whether the data recorded in the lead-in area has been completely read at step S24. If the data recorded in the lead-in area has been completely read, the device switches the reproduction processing method to a default reproduction processing method for reproducing the data recorded in the data area, and performs a reproduction or recording operation at step S25.

The above-described two methods for reproducing and recording data of the high-density optical disc in accordance with the two embodiments of the present invention can selectively use a separate reproduction or demodulation method for reproducing the data recorded in the lead-in area and a default reproduction or demodulation method for reproducing the data recorded in the data area.

When the high-density optical disc 40 having the lead-in area and lead-out area in which the same control information is recorded, is inserted and loaded in the optical disc reproduction or recording device, the device determines whether the control information is appropriately read in a procedure of first reading and confirming the control information recorded in the lead-in area 401. At this time, if the control information is not appropriately confirmed, the device moves an optical pick-up to the lead-out area 403 and then reads the control information copied to the lead-out area 403. In this procedure, the device determines whether the control information copied to the lead-out area 403 is appropriately read. If the control information copied to the lead-out area 403 is not appropriately read, the device determines that an error of a reproduction or recording operation for the inserted disc occurs. Then, the device terminates the operation. On the other hand, if the control information recorded in the lead-in or lead-out area is appropriately read, the device can appropriately perform a sequence of reproduction or recording operations for reading/reproducing or recording data of the data area 402.

The present invention has been described on the basis of the disc data reproduction. The present invention can be applied for a method and device for recording, in the specified area, information needed for reproducing data recorded in the lead-in area or optically modulating a mark or space of the lead-in area having a minimum length different from a minimum mark or space length of the data area. In particular, the present invention can be easily applied for mastering equipment. That is, the present invention can be extended to a method for manufacturing a disc having a specified area in which identification information associated with a lead-in area is recorded so that the data of the lead-in area can be appropriately read in a state where the minimum mark or space length of data of the lead-in area is longer than that of data of the data area.

As apparent from the above description, the present invention provides a high-density optical disc and a method for reproducing or recording data thereof, which can allow an optical disc device to correctly read and confirm control information from the high-density optical disc, minimize the interference between a mark and space in high-density recording data, reduce the effects of scratches or dust on the disc, and efficiently prevent an erroneous data reproduction or recording operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for reading data from a recording medium, comprising:
    (a) receiving a command to read data recorded in a given one of a lead-in area or a user-data area of the recording medium, wherein a length of a mark or space usable in the lead-in area to represent data is different than a length of a mark or space usable in the user-data area to represent data; and
    (b) selecting, based at least upon the length of a mark or space in the given area, one of differing at least first and second processing blocks to read the data recorded in the given area, the selected processing block not including a Viterbi decoder if the given area is the lead-in area.

2. The method as set forth in claim 1, wherein the selected second processing block includes a Viterbi decoder if the command is to read data recorded in user-data area.

3. The method as set forth in claim 1, wherein the selected second processing block includes a PRML method if the command is to read data recorded in user-data area.

4. A method, for reading data from a recording medium, comprising:
    (a) receiving a command to read data recorded in a given one of a lead-in area or a user-data area of the recording medium, wherein a length of a mark or space usable in the lead-in area to represent data is different than a length of a mark or space usable in the user-data area to represent data; and (b) selecting, based at least upon the length of a mark or space in the given area, one of differing at least first and second processing blocks to read the data recorded in the given area, the selected processing block not including a partial response and maximum likelihood (PRML) method if the given area is the lead-in area.

5. A method for reading data from a recording medium, the method comprising:

(a) identifying a given area, from which data is to be read, as either a user-data area or as a non-user-data area based upon a length of a mark or space used to represent data in the given area, the non-user-data area corresponding to one of at least a lead-in area and a lead-out area, and a length of a mark or space usable in the user-data area to represent data being different from that of a length of a mark or space usable in the non-user-data area to represent data; and (b) processing (i) data recorded in the user-data area using a Viterbi decoder if the given area is identified as the user-data area or (ii) data recorded in the non-user-data area using an alternative method that does not include a Viterbi decoder if the given area is the non-user-data area.

6. The method as set forth in claim 5, further comprising:

(d) controlling a reading of data according to an optical transfer function in the user-data area, the optical transfer function in the user-data area being different from that in the non-user-data area.

7. An apparatus for reading data from a recording medium, the apparatus comprising:

(a) a signal processor including at least two processing blocks, at least one of the processing blocks being adapted to process data recorded in at least a lead-in area, and one or more different ones of the processing blocks being adapted to process data recorded in at least a user-data area, one of the at least two processing blocks including a block for a partial response and maximum likelihood (PRML) method; and (b) a controller to control the signal processor to select one of the at least two processing blocks and as such respectively process given data according to whether the given data is recorded in the lead-in area and the user-data area.

8. The apparatus of claim 7, wherein the controller selects a first processing block including a block for a partial response and maximum likelihood (PRML) to process data recorded in the user-data area.

9. The apparatus of claim 8, wherein the block for a partial response and maximum likelihood (PRML) includes a Viterbi decoder.

10. The apparatus of claim 7, wherein the controller selects a second processing block at least without a block for a partial response and maximum likelihood (PRML) to process data recorded in the lead-in area.

11. The apparatus of claim 7, wherein the controller controls a reading of data according to an optical transfer function in the user-data area, the optical transfer function in the user-data area being different from that in at least one of the lead-in area and the lead-out area.

12. The method as set forth in claim 4, wherein the selected second processing block includes the PRML method if the command is to read data recorded in the user-data area.

\* \* \* \* \*